United States Patent [19]

Mahdjuri et al.

[11] 4,270,520

[45] Jun. 2, 1981

[54] SOLAR COLLECTOR COMPRISING AN EVAPORATION/CONDENSATION SYSTEM

[75] Inventors: Faramarz Mahdjuri, Bergamo, Italy; George A. A. Asselman; Johan C. de Grijs, both of Eindhoven, Netherlands

[73] Assignee: U.S. Philips Corporation, New York, N.Y.

[21] Appl. No.: 5,735

[22] Filed: Jan. 23, 1979

[30] Foreign Application Priority Data

Feb. 2, 1978 [DE] Fed. Rep. of Germany ....... 2804411

[51] Int. Cl.³ ................................................. F24J 3/02
[52] U.S. Cl. ................................. 126/433; 165/104.21
[58] Field of Search ............... 126/433, 444, 446, 447; 165/104.21

[56] References Cited

U.S. PATENT DOCUMENTS

| 4,038,966 | 8/1977 | Harrison | 126/433 |
| 4,061,131 | 12/1977 | Bohanon | 126/433 |
| 4,080,957 | 3/1978 | Bennett | 165/105 |
| 4,099,556 | 7/1978 | Roberts, Jr. | 165/105 |

FOREIGN PATENT DOCUMENTS 52-11460  1/1977  Japan ..................................... 165/105

Primary Examiner—James C. Yeung
Attorney, Agent, or Firm—Thomas A. Briody; William J. Streeter; Rolf E. Schneider

EXEMPLARY CLAIM

A solar collector comprises a flat absorber and an associated evaporation/condensation system. The evaporation zone, which is in thermal contact with the absorber, has a number of outwardly and downwardly extending protrusions which are spaced along its length and which serve for collecting heat transport medium condensate returning to the evaporation zone under the influence of gravity.

1 Claim, 14 Drawing Figures

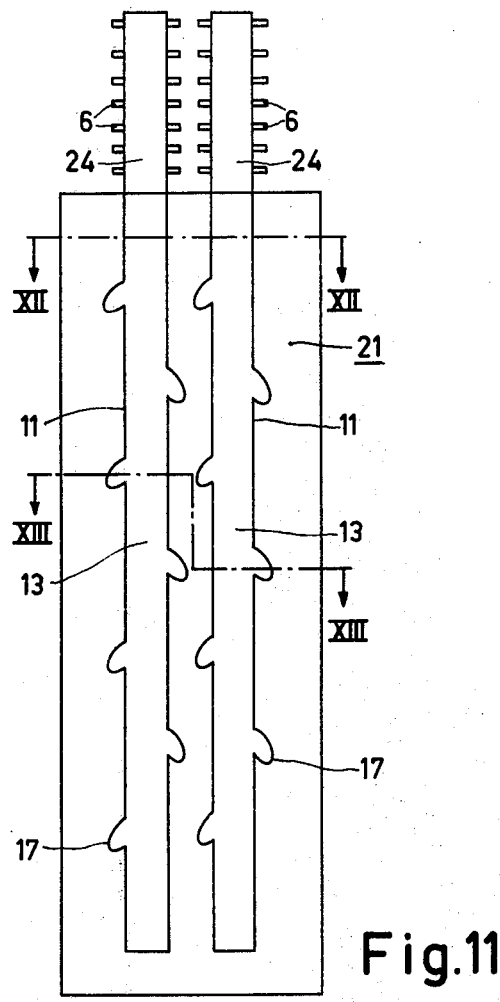
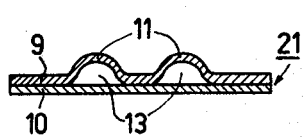
Fig.11
Fig.12
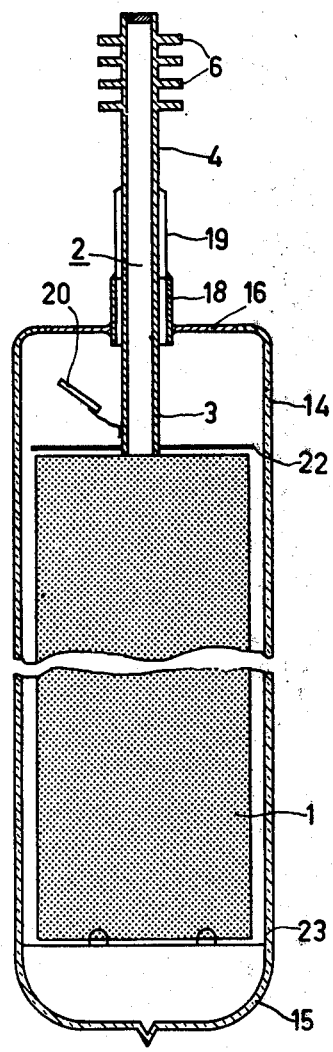
Fig.14
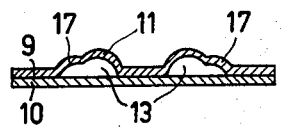
Fig.13

SOLAR COLLECTOR COMPRISING AN EVAPORATION/CONDENSATION SYSTEM

This invention relates to a solar collector, comprising a flat, metal absorber for solar radiation and at least one elongate closed duct which is bounded by metal walls and which contains an evaporable heat transport medium, said duct comprising an evaporation zone which is in thermal contact with the absorber and a condensation zone which is arranged at a higher level during operation than the evaporation zone.

The heat transport medium which is liquid in the cold condition normally collects in the evaporation zone of the closed duct. When this zone is heated via the solar energy absorber, the heat transport medium is also heated and rises in the form of vapour in the duct to the condensation zone where it condenses while giving off its evaporation heat, after which the heat transport medium returns to the evaporation zone in the liquid state.

In a known solar collector of the described kind, the heat transport medium condensed in the condensation zone returns to the evaporation zone under the influence of gravity. However, in the cold condition, the complete quantity of heat transport medium collects at the bottom of the evaporation zone, so that when it is heated, a comparatively long period of time is required before an adequate quantity of heat transport medium vapour is available for transporting heat from the evaporation zone to the condensation zone.

This means that the solar collector requires a rather long starting time before it commences to act as a supplier of heat.

The present invention has for its object to provide such a solar collector having an evaporation/condensation system in which the starting time is drastically reduced.

This is realised in the solar collector in accordance with the invention in that the evaporation zone includes a number of protrusions which are distributed over its longitudinal dimension at a distance from each other and which serve to collect condensed heat transport medium returning to the evaporation zone under the influence of gravity.

During the starting of the solar collector, when the evaporation zone is heated by means of the absorber, not only heat transport medium collected at the lower end of the evaporation zone vaporizes, but also the heat transport medium collected in the protrusions. It is thus achieved that when heat is applied, an adequate quantity of heat transport medium vapour is available within a comparatively short period of time for starting the heat transport.

The protrusions may extend in the plane of the absorber or parallel thereto; however, they may alternatively extend transversely thereof.

In a preferred embodiment of the solar collector in accordance with the invention, the duct is formed of a separate, closed tube, the evaporation zone of which, together with the protrusions in the tube wall, is in thermal contact with the absorber.

In the absorber there may be provided recesses into which the protrusions of the tube wall project.

The absorber may alternatively consist of two interconnected metal plates having trough-shaped portions which form the evaporation zone of the duct, at least one of the metal plates being provided with openings wherethrough the protrusions project outwardly.

In a further embodiment of the solar collector in accordance with the invention, the absorber and the evaporation zone form one unit which consists of two interconnected metal plates, at least one of which has a trough-shaped portion so as to form the evaporation duct, the protrusions being constructed as projections of the trough-shaped portion.

Preferably, the absorber and the evaporation zone are accommodated in an evacuated envelope of a transparent material. The heat losses of the solar collector are thus minimized.

When use is made of a heat transport medium having a critical temperature $T_k$ which corresponds to the maximum permissible operating temperature of a heating system cooperating with the condensation zone, and a critical pressure $P_k$ which is less than 6 MPa, it is achieved that, when the critical temperature in the evaporation/condensation system is exceeded—in the case of stationary operation of the heating system or in the case of oversupply of solar energy—the thermodynamic cycle is interrupted, so that a temperature limiting effect for the heating system occurs and overheating thereof is simply prevented.

After cooling of the heat transport medium to below its critical temperature, the heat transport commences again. As a result of a critical pressure below 6 MPa, the pressure in the evaporation/condensation system remains sufficiently low to prevent mechanical overloading of the duct walls. In the heating system use is often made of water or a water glycol mixture as a heat carrier. The critical temperature of the heat transport medium in the evaporation/condensation system in that case should not exceed a value of 120° C. Some suitable heat transport media of this kind are given in the table below (Freon is a registered trade name).

| Heat transport medium | critical temperature $(T_k)$ °C. | critical pressure $(P_k)$ MPa |
|---|---|---|
| Freon 12 ($CF_2Cl_2$) | 112 | 4.12 |
| Freon 22 ($CHF_2Cl$) | 96 | 4.98 |
| Freon 500 ($CF_2Cl_2/CH_3CHF_2$) | 106 | 4.42 |
| Freon 502 ($CHF_2Cl/CClF_2$—$CF_3$) | 82 | 4.07 |
| Freon 13B1 ($CBrF_3$) | 67 | 3.96 |
| Freon C 318 ($C_4F_8$) | 115 | 2.78 |
| propane ($C_3H_8$) | 96.8 | 4.34 |

The invention will now be described in detail with reference to the accompanying drawings, in which:

FIG. 11 shows a solar collector which comprises two interconnected absorber plates wherebetween two evaporation ducts are formed.

FIG. 12 is a cross-sectional view, taken along the line XII—XII, of the solar collector shown in FIG. 11.

FIG. 13 is a cross-sectional view, taken along the line XIII—XIII, of the solar collector shown in FIG. 11.

FIG. 14 is a longitudinal sectional view of a solar collector of the kind shown in FIG. 1 which is arranged for the greater part of an evacuated, transparent envelope.

Figure 1:
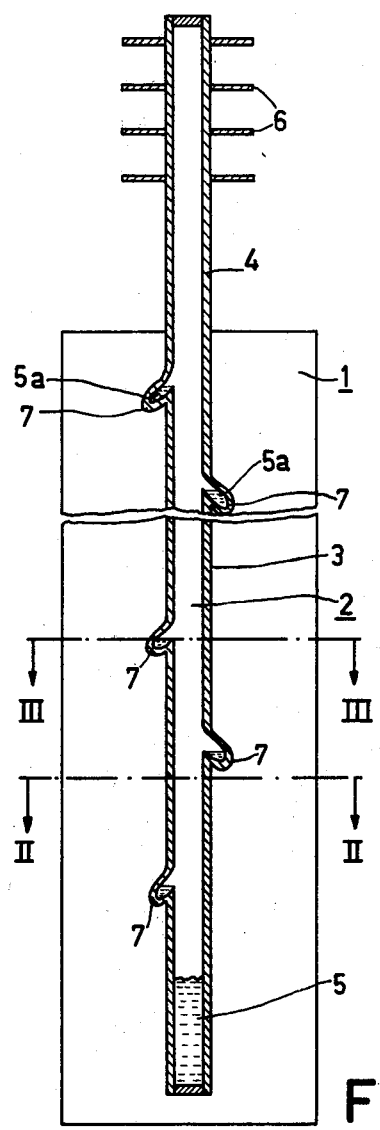
FIG. 1 is a bottom view, partly in section of a solar collector, comprising an absorber plate and an evaporation/condensation tube.
Figure 2:
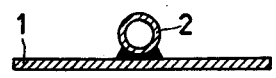
FIG. 2 is a sectional view, taken along the line II—II, of the solar collector shown in FIG. 1.
Figure 3:
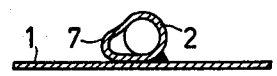
FIG. 3 is a sectional view, taken along the line III—III, of the solar collector shown in FIG. 1.

The solar collector shown in the FIGS. 1 to 3 comprises a flat, metal absorber 1 which consists of, for example, an aluminium plate which is provided on its upper side with a nickel oxide or copper oxide or sulphide layer. A sealed metal tube 2 is connected to the absorber 1, for example, by soldering or welding, said tube acting as an evaporator 3 at the area of the absorber 1, whilst its part which projects above the absorber 1 serves as a condenser 4 for a heat transport medium 5, for example, a hydrocarbon present in the tube 2.

In the condensation zone 4, the tube 2 is provided with a number of fins 6 which are flushed by an external heat transport medium, for example, water, of a heating system which co-operates with the solar collector but which is not shown.

During operation, the solar collector is arranged so that the condenser 4 is situated at a higher level than the evaporator 3, so that the liquid heat transport medium 5 normally collects at the bottom of the evaporator 3. When the absorber 1, and hence the evaporation zone 3 of the tube 2, are heated by solar radiation, the heat transport medium evaporates and flows in vapour form to the condensation zone 4 where it condenses while giving off heat. The condensate returns to the evaporation zone 3 along the inner wall of the tube 2 under the influence of gravity.

In order to ensure that a large quantity of vapour becomes available for heat transport within a short period of time after starting of the solar collector, the evaporation zone 3 of the heat pipe 2 is provided with a number of outwardly and downwardly directed protrusions 7 which are distributed over its length at a distance from each other and which serve for collecting condensed heat transport medium 5a which flows back under the influence of gravity. The protrusions 7 in this case extend parallel to the plane of the absorber 1.

Figure 4:
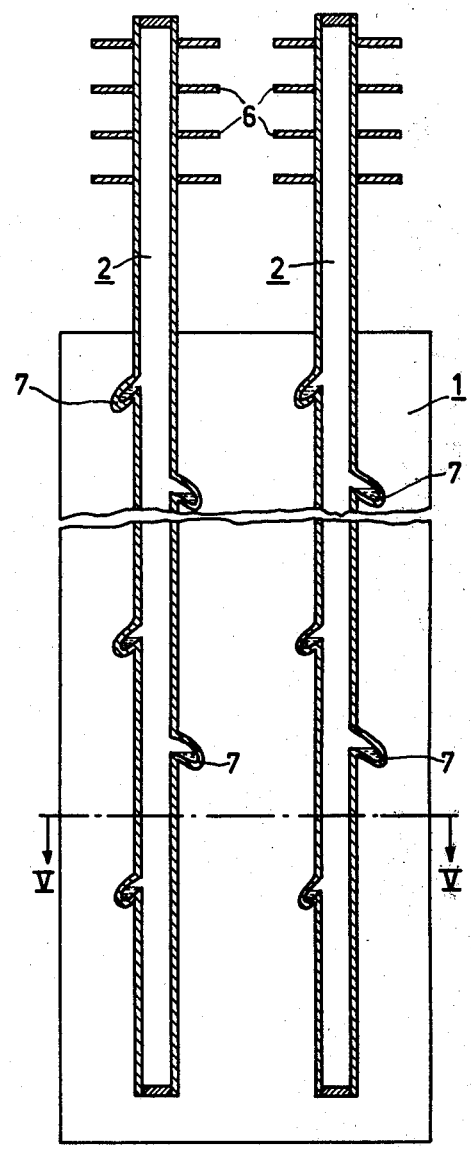
FIG. 4 is a bottom view, partly in section of a solar collector, comprising an absorber plate and two evaporation/condensation tubes.
Figure 5:
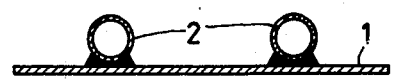
FIG. 5 is a sectional view, taken along the line V—V, of the solar collector shown in FIG. 4.

The solar collector shown in FIGS. 4 and 5 differs from that shown in FIGS. 1 to 3 only in that the flat metal absorber 1 is provided with two evaporation/condensation tubes 2, both of which include protrusions 7 for collecting the condensed heat transport medium.

Figure 6:
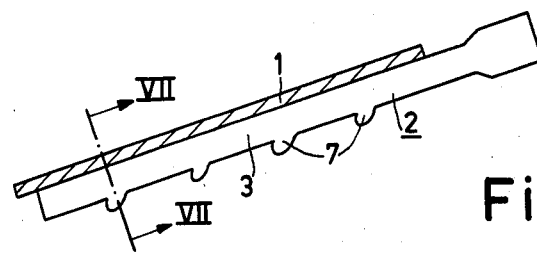
FIG. 6 is a side elevation of a further solar collector.
Figure 7:
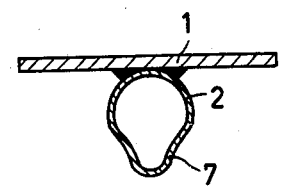
FIG. 7 is a cross-sectional view, taken along the line VII—VII, of the solar collector shown in FIG. 6.

In the solar collector shown in FIGS. 6 and 7, the protrusions 7 for collecting the returning heat transport medium are provided on the lower side of the tube 2 in the evaporation zone 3.

Figure 8:
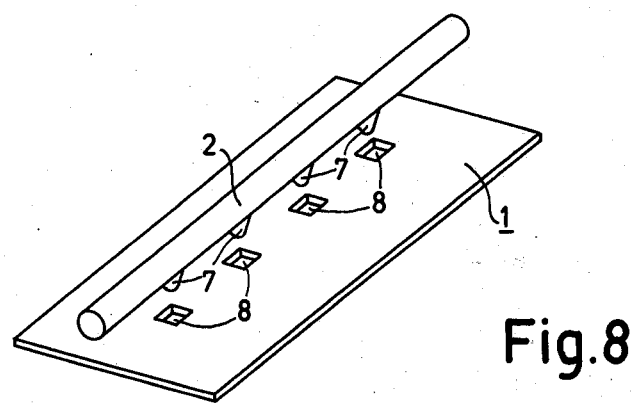
FIG. 8 is a perspective view of a further embodiment of a solar collector in disassembled condition.
Figure 9:
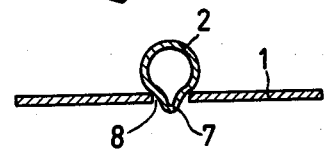
FIG. 9 is a cross-sectional view of the solar collector shown in FIG. 8 in assembled condition.

In accordance with FIGS. 8 and 9, the plate-shaped absorber 1 is provided with recesses 8 into which the downwardly projecting protrusions 7 of the tube 2 are inserted. FIG. 9 shows this solar collector in the assembled condition.

Figure 10:
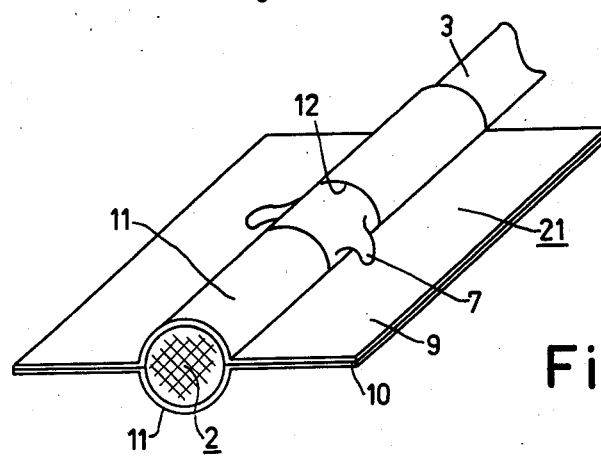
FIG. 10 is a perspective view of a solar collector comprising an evaporation/condensation tube which is arranged between two absorber plates.

The absorber 21 of the solar collector shown in FIG. 10 consists of two interconnected metal plates 9 and 10 which are provided with trough-shaped portions 11 which enclose the evaporation zone 3 of the tube 2. In the upper plate 9, i.e. in the trough 11 thereof, openings 12 are provided wherethrough the protrusions 7 of the tube 2 project. In the lower plate 10 there may also be provided openings (shifted in the axial direction) wherethrough downwardly directed protrusions can project.

The solar collector shown in FIGS. 11 to 13 also comprises an absorber 21 which consists of two interconnected metal plates 9 and 10, for example, joined by way of the so-called rollbond process, the upper plate having two trough-shaped portions 11 for forming two evaporation ducts 13 which are closed at their lower ends and which are filled with a quantity of a heat transport medium, whilst their upper ends are connected to closed condenser ducts or tubes 24. The absorber 21 and the evaporation ducts 13 form one unit. The upper metal plate 9 is deformed so that the evaporation ducts 13 are provided with laterally downwardly directed protrusions 17 which are distributed over their length and which serve to form reservoirs for collecting the returning condensed heat transport medium.

If desired, the two evaporation ducts 13 may be interconnected at the beginning and at the end, and also at some intermediate points in the case of long solar collectors. In that case, one central condenser duct 24 would suffice.

FIG. 14 shows the solar collector of FIG. 1, the plate-shaped absorber 1 and the evaporation zone 3 of the tube 2 being accommodated in a glass cover tube 14. The cover tube 14 has a circular cross-section and is sealed at the end face 15. The end face 16 is made of a lead-glass and is connected in a vacuum-tight manner to a cylindrical metal sleeve 18 which is arranged around the tube 2 and which is made of, for example, copper or a nickel-iron alloy. The metal sleeve 18 is extended to form a thin-walled metal sleeve 19 which consists of, for example, brass or stainless steel and which is connected to the tube 2 in a vacuum-tight manner. As a result of this construction, thermal stresses between the metal tube 2 and the glass cover tube 14 are avoided. The cover tube 14 is evacuated to a residual gas pressure of less than 1 mbar. In order to improve the vacuum, a getter 20 is provided in the cover tube 14.

At the ends of the plate-shaped absorber 1 there are provided reflectors 22 and 23 which extend transversely of the axis of the tube 2 and which may consist of mica provided with a layer of aluminium by vapour deposition. The reflector 23 also serves for keeping the absorber 1 in position in the cover tube 14. The heat losses are reduced as a result of the arrangement of the solar collector in the evacuated cover tube 14. For further improvement, the inner side of the cover tube 14 may be completely or partly covered with a selective heat-reflective layer which may consist of, for example, zinc-doped indium oxide.

A plurality of these solar collectors may be connected, arranged one alongside the other, to a heat exchange duct wherethrough a separate liquid heat carrier of a heating system flows, the fins 6 of the condensers 4 projecting into the heat exchange duct. A solar collector system having a very large collecting surface area is thus obtained.

What is claimed is:

1. A solar collector which comprises a flat metal absorber for solar radiation; a separate closed elongate metal tube containing a vaporizable heat transport medium, said metal tube having an evaporation zone in direct thermal contact with the flat metal absorber and a condensation zone arranged at a higher level than the evaporation zone, the heat transport medium being vaporized in the evaporation zone and the resulting vapours being condensed in the condensation zone during operation; recesses formed in said flat metal absorber adjacent said metal tube, said recesses being spaced from each other longitudinally of the metal tube; a number of hollow protrusions extending outwardly and downwardly from the evaporation zone of the metal tube and respectively projecting into said recesses, said protrusions being spaced along the length of the evaporation zone and providing traps for the collection of heat transport medium condensate returning to the evaporation zone under the influence of gravity; and an evacuated envelope of a transparent material surrounding and accommodating the flat metal absorber and the evaporation zone of the metal tube.

* * * * *